(12) United States Patent
Shaffer et al.

(10) Patent No.: US 12,440,432 B2
(45) Date of Patent: Oct. 14, 2025

(54) METHODS AND COMPOSITIONS FOR TREATMENT OF SKIN

(71) Applicant: Topix Pharmaceuticals, Inc., North Amityville, NY (US)

(72) Inventors: Burt R. Shaffer, Lloyd Harbor, NY (US); Steven M. Hernandez, Blue Point, NY (US)

(73) Assignee: Topix Pharmaceuticals, Inc., North Amityville, NY (US)

( * ) Notice: Subject to any disclaimer, the term of this patent is extended or adjusted under 35 U.S.C. 154(b) by 0 days.

(21) Appl. No.: 16/198,256

(22) Filed: Nov. 21, 2018

(65) Prior Publication Data
US 2019/0151214 A1   May 23, 2019

Related U.S. Application Data

(60) Provisional application No. 62/589,552, filed on Nov. 21, 2017.

(51) Int. Cl.
| | | |
|---|---|---|
| *A61K 8/365* | (2006.01) | |
| *A61K 8/06* | (2006.01) | |
| *A61K 8/42* | (2006.01) | |
| *A61K 9/00* | (2006.01) | |
| *A61K 9/06* | (2006.01) | |
| *A61K 31/17* | (2006.01) | |
| *A61K 31/19* | (2006.01) | |
| *A61K 47/10* | (2017.01) | |
| *A61K 47/12* | (2006.01) | |
| *A61K 47/14* | (2017.01) | |
| *A61K 47/24* | (2006.01) | |
| *A61P 17/00* | (2006.01) | |
| *A61Q 19/00* | (2006.01) | |
| *A61K 9/127* | (2006.01) | |

(52) U.S. Cl.
CPC ............... *A61K 8/365* (2013.01); *A61K 8/06* (2013.01); *A61K 8/42* (2013.01); *A61K 9/0014* (2013.01); *A61K 9/06* (2013.01); *A61K 31/17* (2013.01); *A61K 31/19* (2013.01); *A61K 47/10* (2013.01); *A61K 47/12* (2013.01); *A61K 47/14* (2013.01); *A61K 47/24* (2013.01); *A61P 17/00* (2018.01); *A61Q 19/007* (2013.01); *A61K 9/127* (2013.01)

(58) Field of Classification Search
None
See application file for complete search history.

(56) References Cited

U.S. PATENT DOCUMENTS

| | | | | |
|---|---|---|---|---|
| 3,231,472 | A | * | 1/1966 | Engelmann ............ C07H 15/12 514/42 |
| 5,571,503 | A | * | 11/1996 | Mausner .................. A61K 8/73 424/59 |
| 9,168,283 | B2 | * | 10/2015 | Zheng ..................... A61Q 19/08 |
| 9,399,009 | B1 | | 7/2016 | Clark et al. |
| 9,492,407 | B2 | | 11/2016 | Sundbom Nilsson et al. |
| 2006/0110415 | A1 | * | 5/2006 | Gupta .................. A61K 8/0212 424/401 |
| 2007/0003486 | A1 | * | 1/2007 | Jones ................ A61K 38/4826 424/45 |
| 2007/0248555 | A1 | * | 10/2007 | Watson .................. A61K 8/345 424/70.13 |
| 2010/0061946 | A1 | | 3/2010 | Scherner et al. |
| 2015/0283055 | A1 | * | 10/2015 | Bonnet ................... A61P 17/16 424/401 |
| 2016/0271033 | A1 | | 9/2016 | Kulesza |

FOREIGN PATENT DOCUMENTS

| | | | | |
|---|---|---|---|---|
| RU | 2038073 C1 | 6/1995 | | |
| RU | 2496476 C1 | 10/2013 | | |
| RU | 2622020 C1 | 6/2017 | | |
| WO | 94/21216 A1 | 9/1994 | | |
| WO | WO-03086291 A2 | * | 10/2003 | ............ A61K 8/365 |
| WO | 2011104562 A1 | 9/2011 | | |
| WO | WO-2013092080 A1 | * | 6/2013 | ............ A61K 8/365 |
| WO | WO-2014140524 A1 | * | 9/2014 | ............ A61P 31/10 |

OTHER PUBLICATIONS

Banchhor, Madhuri et al. Potentiality of Papain as an Antiaging Agent in cosmetic formulation. Pharmacognosy Reviews [Phcog Rev.] vol. 2, Issue 4, Jul.-Dec. 2008. p. 266-270. (Year: 2008).*
International Search Report for corresponding International Patent Application No. PCT/US 2018/062320, mailed Mar. 14, 2019.
Written Opinion issued by the International Searching Authority for corresponding International Patent Application No. PCT/US2018/062320, mailed Mar. 14, 2019.

(Continued)

*Primary Examiner* — Nghi V Nguyen
(74) *Attorney, Agent, or Firm* — Lowenstein Sandler LLP

(57) ABSTRACT

Disclosed are effective, non-irritating, skincare formulations containing an alpha hydroxy acid and urea or a urea derivative for topical application to the skin. The disclosed topical formulations provide enhanced penetration of the active ingredients to the skin for the treatment of amenable skin conditions, such as very dry skin and keratosis pilaris, as well as for improvement of aesthetic skin properties. Also provided are methods for therapeutic treatment of dermatological conditions by topically applying a formulation comprising (% w/w) at least 10% alpha hydroxy acid and at least 10% urea. The formulations may be cream emulsions, spray-ons, among other delivery systems.

25 Claims, No Drawings

(56) References Cited

OTHER PUBLICATIONS

Sazykina et al. "URODERM, Combined Therapy for Excess Keratinization and Fungal Infections of the Skin and Nails", Clinical Dermatology and Venerology, vol. 1, (2013), Edited by V.I. Nosdrin, pp. 1-6, Moscow.
European Search Report for EP18881031.1 dated Jun. 1, 2021, 6 pages.
Belousova T.A., "Passages, Uroderm", Uroderm: (urea ointment 30%), 2015, pp. 6,18,21-23, ISBN 978-5-93118-038-0, XP009520668 with English machine translation.

* cited by examiner

METHODS AND COMPOSITIONS FOR TREATMENT OF SKIN

CROSS-REFERENCE TO EARLIER APPLICATIONS

This application claims priority under 35 U.S.C. § 119(e) to U.S. Provisional Patent Application Ser. No. 62/589,552, filed Nov. 21, 2017, the entire contents of which are incorporated herein by reference.

FIELD

The present invention relates to the field of therapeutic treatments and compositions for topical skincare, including skincare treatments and formulations having alpha hydroxy acids and urea, for topical application to the skin, as well as to methods for their formulation, manufacture and use thereof.

BACKGROUND

Hydroxy acids, such as alpha hydroxy acids (AHA) and beta hydroxy acids (BHA), and carboxylic acids, such as dicarboxylic acids, are used in the treatment of various and diverse dermatological conditions.

Alpha hydroxy acids, such as glycolic acid and lactic acid, are biologically active in skin treatment and penetrate the skin to provide exfoliation due to the acidic properties, and humectation, i.e., skin moisturizing, due to the high water binding capability and other properties of these compounds. Beta hydroxy acids, such as salicylic acid, which is often referred to as a BHA, as well as other BHAs, are both keratolytic and comedolytic. Dicarboxylic acids are used in skincare for acne treatment, among other uses.

In skincare treatments it has been noted that some compositions, containing, for example, an AHA, cause irritation and a burning sensation such that the skin becomes painful or itchy and red, particularly in people with sensitive skin. Skin conditions requiring high concentrations of acidic agents cause sensitization reactions. Since some skincare products can be irritating to the skin, it discourages continued application by those in need of treatment with such formulations, thereby reducing, if not eliminating, the efficacy of the treatment. To avoid the possibility of skin irritation, and other adverse reactions, the concentration of these ingredients in mass market skincare products is kept at levels below 10% thereby reducing the potency of the treatments, in particular, for skin conditions that require higher percentages of the active agent. Such skincare products may not be effective in treating very dry skin and keratosis pilaris, and other severe dermatological conditions.

Urea and urea derivatives also are used in skincare products as a rehydration agent through topical application to the skin. In addition to acting as a humectant, urea provides skin protection and exfoliation to the skin. In this, urea is used as a buffering agent, humectant, and skin-conditioning agent in cosmetic products. Some skin conditions, however, require high concentrations of urea. Formulations having 40% of urea are prescribed for various dermatological conditions, including nonsurgical debridement of nails. Treatment with urea may produce a temporary minor sting due to hypo-osmolarity, i.e., intense penetration, of the skincare cream.

Accordingly, there is a need in the art for improved topical formulations that can provide treatment to the skin of those in need thereof to alleviate and ameliorate one or more of the conditions noted above. More specifically, there is a need in the art for improved skincare formulations having both an acidic component, such as an AHA, and urea and/or its derivatives, which in combination retain their skin treatment properties described above while providing enhanced results, superior to the results when the ingredients are separately applied, in therapeutic treatments for very dry skin and conditions such as keratosis pilaris, among others.

The present disclosure provides new, improved therapeutic treatments for various and diverse dermatological conditions, such as cosmetic problems of the skin, scalp, hair, nails, including very dry skin and keratosis pilaris. The improved therapeutic treatments disclosed herein exhibit low irritancy and sensitization reactions, yet provide increased efficacy and keratolytic effect of the combined active agents including, among other active ingredients, an AHA, such as glycolic acid, and urea.

SUMMARY

The present disclosure provides skincare treatments, and more particularly, therapeutic treatments with formulations having both an acidic component, such as an AHA, for example, glycolic acid, BHA, carboxylic acid, and a urea component in amounts that effectively alleviate dermatological conditions without causing undesirable side effects, such as irritation and burning.

In certain aspects, the disclosed formulations contain at least 10% urea and 10% of one or more of an AHA, BHA, carboxylic acid. In other aspects of the present disclosure, the formulations are designed to contain 15% urea and 15% glycolic acid.

The compositions exhibit low irritancy, and improved, synergistic efficiency of the formulated ingredients, including improved keratolytic effects. In particular, the present disclosure provides cosmetic treatments with formulations having a combination of glycolic acid and urea, which exhibit lower irritancy and sensitization reactions, better regression time, and improved exfoliation and penetration properties of all the formulated active ingredients into the skin, as compared with other skincare products.

The present disclosure contemplates use of the disclosed formulations as pre-treatment agents for other topical compositions. As discussed in further detail below, the formulations of the present disclosure have enhanced exfoliating properties, thereby effectively removing dead outer skin layers so that subsequently applied topical skin care compositions have better penetration into the skin. Other topical compositions may include, but are not limited to, retinoid formulations, anti-fungal compositions, compositions for treating diverse and varied dermatological conditions, such as eczema, xerosis, among others.

Topical application of the disclosed formulations may include application to specific body areas, such as, without limitation, feet, elbows, knees, that are susceptible to dermatological conditions of the type requiring the therapeutic treatments disclosed herein. Such treatments may be applied, for example, 1-3 times per day, for example, after showering, among others. The present disclosure contemplates that the disclosed treatments would reduce the dermatological conditions of the affected areas, followed by regular topical applications, as desirable or necessary, to maintain the improved condition of the body areas under treatment.

In some embodiments, the present disclosure provides formulations comprising 10% to 40% of an AHA and 10% to 40% of urea or urea derivatives that are useful in the therapeutic treatment of dermatological conditions. In certain aspects of the present disclosure, skincare formulations are provided having 15% of glycolic acid and 15% of urea with the addition of peptides, such as an exfoliating peptide, amino acids, such as an amino acid profile similar to human natural moisturizing factor (NMF), proteolytic enzymes, keratolytic agents, BHA, ceramides, such as biomimetic ceramides, sodium hyaluronate, such as hydrolyzed sodium hyaluronate.

The present disclosure contemplates other combinations of the active ingredients disclosed herein such that the desired improved treatment results are achieved. Surprisingly, it has been found that the combination of glycolic acid and urea at about 15% each yields results that are comparable to 40% urea topical formulations. Further, additional ingredients, as further specified herein, also have observable benefits that exceed their usual scope.

The inventors believe, without wishing to be held to that belief, that the unexpected, improved results disclosed herein are due to increased exfoliating action of the glycolic acid-urea combination. Improved regression times also have been reported such that users can stop topical treatment for longer time periods before the dermatological conditions return with their original severity.

In other embodiments, the disclosed formulations provide increased efficiency in the exfoliation and treatment of very dry skin and keratosis pilaris by the combination of glycolic acid and urea, low irritancy, and improved penetration of all the other ingredients in the formulations, when applied to the skin. In one aspect of this disclosure, the skin is human skin, scalp, hair, nails, including very dry skin and skin exhibiting keratosis pilaris. In other aspects of the present disclosure, the skin is that of a companion animal, a domestic animal, or a commercially useful animal.

The treatments of the present disclosure are effective for treating keratosis pilaris. In this, it has been found that glycolic acid acts as an exfoliant or mild epidermolytic at certain pH ranges, such as a pH range of 3.5 to 7.0 in some embodiments of the disclosed formulations. Urea has mild keratolytic effect at 10% to 30%. Although neither is effective independently in treating keratosis pilaris, the glycolic acid-urea combinations of the disclosed formulations provide effective methods for treating keratosis pilaris.

In the disclosed skincare treatments, glycolic acid and urea retain their skin treatment properties when topically applied to the skin in the combination amounts of the present disclosure. The disclosed amounts for glycolic acid and urea in the skincare formulations provide surprising results in that the combined agents provide exfoliation and humectation results that are better than would be expected from the individual agents.

The disclosed treatments may also comprise peptides, including an exfoliating peptide, amino acids, including an amino acid profile similar to the human skin natural moisturizing factor (NMF), a proteolytic enzyme, a keratolytic agent, a BHA, ceramides, including biomimetic ceramides, sodium hyaluronate, including hydrolyzed sodium hyaluronate. Surprisingly, it has been found that the formulated ingredients have better skin penetration due to the increased exfoliation of the glycolic acid-urea combination which removes dead outer skin layers.

The disclosed treatments may also comprise one or more of proteolytic enzymes, natural moisturizing factors, skin-protecting agents, such as dimethicone, for example, dimethicone/100 cst., and skin moisturizing agents. The disclosed compositions may also comprise one or more moisturizers and/or humectants. In one aspect of this embodiment, the moisturizer and/or humectant is sodium hyaluronate, such as fractionated and long-chain sodium hyaluronate, from single monomer to about 5 million Daltons, to bind moisture to the skin and penetrate the skin carrying moisture.

The disclosed formulations may also comprise skin soothing agents, such as anti-oxidants, to reduce skin inflammation and irritation, and bio-mimetic ceramide complex that mimics the skin's natural lipid profile.

The disclosed formulations also comprise one or more solubilizing agents, rheology modifiers and/or emulsifiers. In one aspect of this embodiment, the solubilizing agent/emulsifier is a non-ionic solubilizing agent/emulsifier. In one specific aspect of this embodiment, the solubilizing agent/emulsifier is PEG-100 stearate.

The disclosed treatments may also comprise one or more soothing antioxidants to calm the skin and reduce inflammation. In one aspect of this embodiment, the antioxidant is a polyphenol. In a more specific aspect of this embodiment, the antioxidant comprises a polyphenol isolate of *Camellia sinensis*.

The disclosed treatments may also comprise one or more emollients. In one aspect of this embodiment, the emollient is an ester or oil. In various aspects of this embodiment, the emollient can include one or more of the following shea butter, cocoa butter, mineral oil, lanolin, petrolatum, paraffin, beeswax, squalene, cetyl alcohol, olive oil, triethylhexanoin, coconut oil, jojoba oil, sesame oil, almond oil, or other plant oils, lipids, and combinations of two or more thereof.

In certain embodiments of the present disclosure, the formulations may include spray-on products having, for example, at least 10% AHA and 10% urea or urea derivative. The formulations may include one or more humectants, one or more emollients, one or more ceramides or skin lipid supplements, one or more antioxidants, one or more peptides having exfoliation properties, one or more amino acid components of the skin's natural moisturizing factor, and/or one or more proteolytic enzymes.

In certain aspects of the present disclosure, the compositions and treatments include ingredients that provide enhanced, improved performance relative to, for example, exfoliation, remediation of dry skin, among other results. The inventors believe, without wishing to be held to that belief, that these unexpected results are due to composition ingredients such as one or more peptides related to, for example, exfoliation, one or more proteolytic enzymes, one or more amino acid components of the skin's natural moisturizing factor, one or more ceramides or skin lipid supplements, one or more emollients, one or more humectants, one or more antioxidants.

In other aspects of the present disclosure, the compositions and treatments include ingredients that provide enhanced, improved performance relative to, for example, anti-irritant, compliance, among other results. The inventors believe, without wishing to be held to that belief, that these unexpected results are due to composition ingredients such as one or more antioxidants, one or more amino acid components of the skin's natural moisturizing factor, one or more humectants, one or more ceramides or skin lipid supplements, one or more emollients.

The inventors believe, without wishing to be held to that belief, that composition ingredients disclosed herein, and summarized above in general order of importance, provide the major systems for the presently disclosed formulations, such as cream emulsion and spray-on products, among others.

Aspects of the present disclosure provide a method for therapeutic treatment of a dermatological condition. The method includes topically applying to an affected area a therapeutically effective amount of a formulation comprising (% w/w) at least 10% alpha hydroxy acid (AHA) and at least 10% urea or a urea derivative, thereby treating the dermatological condition. In certain aspects of the present disclosure, the treating includes exfoliating affected skin. The affected area may be one or more of human skin, scalp, hair, nails.

In aspects of the present disclosure, the dermatological condition is keratosis pilaris. In other aspects of the present disclosure, the dermatological condition is very dry skin.

In aspects of the present disclosure, topically applying the formulation is pre-treatment for application of a topical agent for treatment of the dermatological condition.

Aspects of the present disclosure provide a topical formulation having (% w/w) at least 10% alpha hydroxy acid (AHA) and at least 10% urea or a urea derivative.

In certain aspects of the present disclosure, the AHA is glycolic acid. In other aspects of the present disclosure, the formulation includes 15% glycolic acid and 15% urea or a urea derivative. In yet further aspects of the present disclosure, the formulation includes 10% to 30% urea or a urea derivative. In certain aspects of the present disclosure, the formulation has pH in the range of 3.5 to 7.0.

In certain aspects of the present disclosure, the formulation includes, without limitation, one or more of an antioxidant, an emulsifier, a moisturizer, and an emollient. In other aspects of the present disclosure, the formulation includes, without limitation, one or more of an exfoliating peptide, an amino acid mixture, a proteolytic enzyme, a keratolytic agent, a beta hydroxy acid (BHA), ceramides, sodium hyaluronate. In aspects of the present disclosure, the amino acid mixture includes one or more amino acids and, in yet other aspects of the present disclosure, the amino acid mixture having one or more amino acids has a profile of the skin's natural moisturizing factor.

In certain aspects of the present disclosure, the formulation includes (% w/w): 10%-40% AHA; 10%-40% urea or urea derivative; 5%-30% potassium hydroxide; 0.1%-5% hydrolyzed sodium hyaluronate; 0.1%-15% capric triglyceride; 0.1%-5% cetearyl glucoside; 0.1%-5% cetearyl alcohol; 0.1%-10% vitamin E acetate; 0.1%-10% glyceryl stearate; 0.1%-10% stearyl alcohol; 0.1%-5% PEG-100 stearate; 0.2%-15% emulsifying wax; 0.02%-2% phenoxyethanol; 0.02%-2% xanthan gum; 0.01%-10% squalane; 0.01%-10% dimethicone.

In certain aspects of the present disclosure, the formulation includes (% w/w): 15% glycolic acid; 15% urea; 5%-15% potassium hydroxide; 0.01%-1% hydrolyzed sodium hyaluronate; 0.5%-5% capric triglyceride; 0.2%-2% cetearyl glucoside; 0.2%-2% cetearyl alcohol; 0.5%-5% vitamin E acetate; 0.1%-4.5% glyceryl stearate; 0.2%-5% stearyl alcohol; 0.2%-2.5% PEG-100 stearate; 0.5%-7.5% emulsifying wax; 0.1%-1% phenoxyethanol; 0.05%-0.5% xanthan gum; 0.5%-5% squalane; 0.05%-5% dimethicone.

Aspects of the present disclosure provide a spray-on formulation having (% w/w) at least 10% alpha hydroxy acid (AHA) and at least 10% urea or a urea derivative. In certain aspects of the present disclosure, the AHA is glycolic acid. In other aspects of the present disclosure, the spray-on formulation includes, without limitation, one or more humectants, emollients, ceramides or skin lipid supplements, antioxidants, exfoliating peptides, proteolytic enzymes, amino acid mixtures. In certain aspects of the present disclosure, the amino acid mixture includes one or more amino acids and, in certain aspects of the present disclosure, the amino acid mixture having one or more amino acids has a profile of the skin's natural moisturizing factor.

DETAILED DESCRIPTION

The present disclosure provides skincare formulations and methods of use thereof for alleviation or amelioration of dermatological conditions amenable to treatment with urea or its derivatives and/or AHAs, including glycolic acid, BHAs, carboxylic acids. It is noted that the present disclosure includes salicylic acid as a BHA; although technically salicylic acid is not a BHA, it is often referred to as such in the technical literature. Dermatological conditions amenable to treatments disclosed herein include, without limitation, inflammatory disorders of the skin and skin conditions characterized by increased cell turnover including psoriasis, photoaging, weather-beaten appearance, yellowing, loss of elasticity, loss of collagen rich appearance and/or youthfulness, redness, dryness, age spots, skin wrinkles, acne, rosacea, ichthyosis, as well as skin cancers. The disclosed therapeutic formulations are also useful for improvement in one or more aesthetic criteria, including, but not limited to, a perceived improvement in apparent skin age, skin tone, weather-beaten appearance, yellowing, loss of elasticity, redness, dryness, age spots, skin wrinkles, skin smoothness, brightness, radiance, as well as skin pores becoming less noticeable.

All percentages and ratios used herein are by weight of the total composition and all measurements made are at room temperature, unless otherwise specified. All percentages, parts, and ratios are based upon the total weight of the compositions disclosed herein, unless otherwise specified.

As used herein, the terms "treatment" or "treating" with respect to a skin condition generally mean "having positive effect on a skin condition" and encompass reduction, amelioration, and/or alleviation of at least one symptom of a skin condition, a reduction, amelioration, and/or alleviation in the severity of the skin conditions, or delay, prevention, or inhibition of the progression of the skin condition. Treatment, as used herein, therefore does not require total curing of the condition. A formulation of the present disclosure that is useful for treatment of a skin condition, or a method of treating a skin condition, need only reduce the severity of a skin condition, reduce the severity of symptoms associated therewith, provide improvement to a patient's quality of life, or delay, prevent, or inhibit the onset of one or more symptoms of a skin condition. As used herein, these terms also encompass aesthetic improvements to the skin upon application of the disclosed formulations having a combination of, for example, an AHA and urea or its derivatives.

As used herein, the terms "application," "apply," and "applying" with respect to a disclosed topical formulation or method of using a disclosed topical formulation, refer to any manner of administering a topical formulation to the skin, for example, the skin of a person, such as the skin of a patient, which, in medical or cosmetology practice, delivers the formulation to the subject's skin surface. Smearing, rubbing, spreading, spraying a disclosed topical formulation, with or without the aid of suitable devices, on a subject's skin are all included within the scope of the term "application," as used herein. The term "topical" or "topically" with respect to administration or application of a disclosed skincare formulation refers to epicutaneous administration or application, onto skin.

As used herein, the phrase "effective amount" refers to an amount of a formulation of the present disclosure, or component thereof, effective to treat a skin condition as noted above, including a range of effects, from a detectable local improvement in an area of topical application to substantial relief of symptoms to an improvement in one or more aesthetic criteria, including, but not limited to, a perceived improvement in apparent skin dryness, keratosis pilaris, age, radiation damage, sun or uv damage, skin tone, weather-beaten appearance, yellowing, loss of elasticity, redness, dryness, age spots, skin wrinkles, skin smoothness, brightness, radiance, as well as skin pores becoming less noticeable. The effective amount will vary with the particular condition or conditions being treated, the severity of the condition, the duration of the treatment, the specific components of the composition being used, and other factors. More specifically, the disclosed compositions and formulations provide a method for therapeutic treatment of skin by providing, in some embodiments, a combination of urea, and/or its derivatives, and an AHA, including glycolic acid, in an efficacious manner to the skin. The disclosed compositions, formulations and methods of use thereof reduce, minimize, or eliminate normally-observed dry skin conditions including, inter alia, conditions characterized by keratosis pilaris, itching, severe skin flaking, breakdown of the skin barrier, discomfort, extreme dryness, cracking of the skin and sensitization. The disclosed compositions, formulations, and methods of use thereof also provide aesthetic improvements in the skin, including but not limited to skin that appears younger, skin exhibiting a more even tone, skin in which the pores are less noticeable, and skin that is judged by the user to be smoother, and/or to be improved with respect to its weather-beaten or aged appearance, yellowing, loss of elasticity, redness, dryness, age spots, and/or skin wrinkles.

The skincare compositions disclosed herein not only maintain the active properties of the active agents, but also provide a greater efficiency of the active agents. In some embodiments, the present disclosure provides formulations comprising both an AHA and urea having stability, low irritancy, and efficient release of the active agents, when applied to the skin. In one aspect of this disclosure the skin is human skin. In other aspects of the present disclosure, the skin is that of a companion animal, a domestic animal, or a commercially useful animal.

The treatments of the present disclosure may contain 10% to 40% of an acidic component, such as an AHA, BHA, carboxylic acid, and 10% to 40% of a urea and/or urea derivative component. Urea derivatives contemplated by the present disclosure include, but are not limited to, derivatives of urea that have similar function or act in the same way as urea when used in skin care treatments, such as dimethylurea, dimethylolurea, hydroxyethyl urea, hydroxyethoxyethyl urea, among others.

The present inventors have found that the treatments of the present disclosure are effective therapeutically for treating dermatological conditions. In certain embodiments of the present disclosure, skincare formulations are provided having 15% of glycolic acid and 15% of urea with the addition of peptides, such as an exfoliating peptide, amino acids, such as an amino acid profile similar to human natural moisturizing factor (NMF), proteolytic enzymes, keratolytic agents, BHA, ceramides, such as biomimetic ceramides, sodium hyaluronate, such as hydrolyzed sodium hyaluronate.

Inventors believe, without wishing to be held to that belief, that an AHA, such as glycolic acid, in high concentration, for example, greater than 10%, when present in the disclosed compositions provides unexpected results as an exfoliating agent. The inventors further believe, without wishing to be held to that belief, that the exfoliation properties of various skin treatment systems disclosed herein are enhanced by exfoliating agents, such as exfoliating peptides, for example, P3 Peptide®, thereby providing unexpectedly effective skin treatment systems.

Chemical exfoliants include, but are not limited to, salicylic acid, glycolic acid, enzymes, organic acids, citric acid, malic acid, lactic acid, tartaric acid, alpha hydroxy acids (AHAs), beta hydroxy acids (BHAs), peptides, which, among other things, interfere with corneocyte adhesion, act as keratolytics, promote epidermal turnover.

Inventors further believe, without wishing to be held to that belief, that in various skin treatment systems disclosed herein enhanced performance, such as exfoliation, remediation of dry skin, among other properties, is due to presence of (in general order of importance) one or more peptides related to, for example, exfoliation, one or more proteolytic enzymes, one or more amino acid components of the skin's natural moisturizing factor, one or more ceramides or skin lipid supplements, one or more emollients, one or more humectants, one or more antioxidants.

Inventors further believe, without wishing to be held to that belief, that in various skin treatment systems disclosed herein enhanced anti-irritation, compliance, among other results, are due to presence of (in general order of importance) one or more antioxidants, one or more amino acid components of the skin's natural moisturizing factor, one or more humectants, one or more ceramides or skin lipid supplements, one or more emollients.

These aforementioned systems are included in various embodiments disclosed herein such as cream emulsions, spray-on formulations, among others that are mentioned hereinafter.

The present disclosure contemplates various combinations of the active ingredients disclosed herein. The inventors have unexpectedly found that the combination of glycolic acid and urea at about 15% each yields results that are comparable to 40% urea topical formulations. Inventors have noted that in treatments according to the methods disclosed herein the additional ingredients also have observable benefits that exceed their usual scope.

The inventors believe, without wishing to be held to that belief, that due to improved exfoliating action of the glycolic acid-urea combination, which more effectively removes dead outer skin layers, better penetration of all other ingredients in the disclosed formulations is achieved. The present disclosure also contemplates use of the disclosed formulations as pre-treatment agents for other topical compositions. The enhanced exfoliating properties of the disclosed compositions effectively removes dead outer skin layers so that subsequently applied topical skin care compositions have better penetration into the skin. Other topical compositions may include, but are not limited to, retinoid formulations, anti-fungal compositions, compositions for treating diverse and varied dermatological conditions, such as eczema, xerosis, among others. The inventors also have observed improved regression times such that users who stop topical treatment can do so for longer time periods without the dermatological conditions returning in their original severity.

In other embodiments, the disclosed formulations provide increased efficiency in the exfoliation and treatments of very dry skin and keratosis pilaris, and other severe dermatological conditions, by the combination of glycolic acid and urea, low irritancy, and improved penetration of all the other ingredients in the formulations, when applied to the skin. As used herein, "very dry skin" refers to a range of dry skin conditions from simple dry skin to xerosis or other dry skin diseases. In one aspect of this disclosure, the skin is human skin, scalp, hair, nails, including very dry skin and skin exhibiting keratosis pilaris. In other aspects of the present disclosure, the skin is that of a companion animal, a domestic animal, or a commercially useful animal.

In certain embodiments of the present disclosure, the treatments are surprisingly effective for treating keratosis pilaris. In embodiments of the present disclosure, glycolic acid acts as a mild epidermolytic, including at a pH range of 3.5 to 7.0 in some embodiments of the present disclosure, and urea at 10% to 30% concentration has mild keratolytic effect. Inventors believe, without wishing to be held to that belief, that although neither glycolic acid nor urea is effective independently in treating keratosis pilaris, the disclosed formulations provide effective methods for treating keratosis pilaris due to the improved exfoliation and penetration effects of the glycolic acid-urea combinations.

In the disclosed skincare treatments, glycolic acid and urea retain their skin treatment properties when topically applied to the skin in the combination amounts of the present disclosure. The disclosed treatments may also comprise peptides, including an exfoliating peptide, amino acids, including an amino acid profile similar to the human skin natural moisturizing factor (NMF), a proteolytic enzyme, a keratolytic agent, a BHA, ceramides, including biomimetic ceramides, sodium hyaluronate, including hydrolyzed sodium hyaluronate. Inventors believe, without wishing to be held to that belief, that the formulated ingredients have better skin penetration due to the increased exfoliation of the glycolic acid-urea combination, which removes dead outer skin layers.

Other exfoliating agents contemplated by the presently disclosed formulations include, but are not limited to, mandelic acid, P3 Peptide®.

In certain embodiments, the disclosed compositions may also comprise one or more preservatives. In one aspect of these embodiments, the preservatives are one or more of disodium EDTA, sodium benzoate, phenoxyethanol.

In certain embodiments, the disclosed compositions may also comprise one or more cosolvents. In one aspect of these embodiments, the cosolvent is butylene glycol.

In certain embodiments, the disclosed compositions may also comprise one or more moisturizers and/or humectants. Humectants are hygroscopic substances used to keep things moist, often a molecule with several hydrophilic groups, or capable of hydrogen bonding with water, or having other polar organic functional groups. Humectants can also function as solvents or cosolvents.

Some examples of humectants include, but are not limited to, amino acids; glycols and polyols, such as propylene glycol, hexylene glycol, and butylene glycol, including polymeric and sugar-based polyols/alcohols, for example, glycerol, sorbitol, xylitol, maltitol, polydextrose; mucopolysaccharides and carbohydrates, for example, aloe vera gel, *yucca* extract, dextrose and polydextrose; alpha hydroxy acids such as glycolic acid, lactic acid; albumen; esters or amides of acetic acid or similar; soluble carbohydrates, such as sugar, honey; salts, such as potassium chloride, sodium PCA, salts of polycarboxylic acids; amides, such as urea and urea derivatives.

In one aspect of these embodiments, the moisturizer and/or humectant is sodium hyaluronate, such as fractionated and long-chain sodium hyaluronate, from single monomer to about 5 million Daltons, to bind moisture to the skin and penetrate the skin carrying moisture. Hyaluronate is a moisture binder that helps keep the skin hydrated and provides "slip" (sensory aesthetics) to the disclosed formulations. Other humectants contemplated by the present disclosure include, but are not limited to, hydrolyzed sodium hyaluronate, hydrolyzed glycosaminoglycans.

The disclosed formulations also comprise one or more solubilizing agents, rheology modifiers and/or emulsifiers. In one aspect of this embodiment, the solubilizing agent/emulsifier is a non-ionic solubilizing agent/emulsifier. In one specific aspect of this embodiment, the solubilizing agent/emulsifier is PEG-100 stearate. In other aspects of these embodiments, the emulsifier may be one or more of cetearyl alcohol, cetearyl glucoside, polysorbate 60, stearyl alcohol, glyceryl stearate, sodium polyacrylate, emulsifying wax.

In further aspects of the disclosed formulations, xanthan gum, such as Keltrol T®, may be provided as an emulsifier for a stable emulsion.

In yet further aspects of the disclosed formulations, an artificial thickening agent, such as Rapithix A-60® from Ashland Chemical, may be provided.

The disclosed treatments may also comprise one or more soothing antioxidants to calm the skin and reduce inflammation. Antioxidants inhibit oxidation, a type of chemical reaction that may produce free radicals. Antioxidants may assist in modulating inflammation, preventing or diminishing allergic or irritant reactions in the skin, including overstimulation of histamine up-regulation.

In this, in the presently disclosed formulations and treatments antioxidants assist in reducing the sting and irritation normally associated with application of high levels of active ingredients, including glycolic acid and urea, as well as calming the existing condition for which the skin is being treated. This brings relief to the user, which leads to heightened compliance with the subject's treatment protocols, as was observed by the inventors in a clinical study.

Exemplary antioxidants include, but are not limited to, polyphenols, ergothioneine, glutathione, tetrahexyldecyl ascorbate, ascorbate derivatives, tocopherols or derivatives thereof, herbals such as pomegranate, cranberry, quercetin, carotenoids, resveratrol, ferulic acid, caffeic acid, gallic acid, topical compounds preventing or reducing the number of oxidative events in the skin, whether or not induced by uv light or solar exposure.

In one aspect of this embodiment, the antioxidant is a polyphenol. In a more specific aspect of this embodiment, the antioxidant comprises a polyphenol isolate of *Camellia sinensis*. The antioxidant can be a polyphenol or a mixture thereof that is isolated from plants, chemically synthesized; the antioxidant can also be a semi-synthetic compound prepared by modification of a natural polyphenol or mixture of polyphenols. In specific embodiments of the present disclosure, the antioxidant includes "green tea polyphenols" isolated and purified from the leaves of *Camellia sinensis* plants. These antioxidants, as formulated and delivered herein, provide antioxidant activity as well as anti-inflammatory activity, and, further, provide skin soothing, protection, and repair activity.

Other antioxidants contemplated by the present disclosure include, but are not limited to, vitamin E acetate.

The disclosed treatments may also comprise one or more emollients. Emollients soften, lubricate and protect the skin from trans-epidermal water loss (TEWL). Some examples of emollients include, but are not limited to, lipids, phospholipids, occlusives, petrolatum, waxes, paraffinic oils, vegetable and animal fats, esters, such as isopropyl myristate, dicaprylyl carbonate, isopropyl palmitate, ethoxylates or propoxylates esters and fats, silicones, butters (cocoa butter, shea butter, etc.) and polyethylene glycols (PEG).

Skin lipids are the "mortar" in the brick and mortar model of the skin. These fats, oils and waxes may have more or less hydrophilic tendency and help prevent trans-epidermal water loss (TEWL), and allow the skin to retain moisture and more effectively repair itself. Examples are ceramides, phospholipids, phytosphingosine, cholesterol, lanosterol, fatty acids, sebum components, many of which can exist and be functional in its natural form, or be functional in the presently disclosed compositions and treatments as a derivative or synthetic analog.

In one aspect of this embodiment, the emollient is an ester or oil. In various aspects of this embodiment, the emollient can include, without limitation, one or more of the following shea butter, cocoa butter, mineral oil, lanolin, petrolatum, paraffin, beeswax, squalene, squalane, cetyl alcohol, olive oil, triethylhexanoin, coconut oil, jojoba oil, sesame oil, almond oil, or other plant oils, lipids, and combinations of two or more thereof.

Other emollients contemplated by the present disclosure include, but are not limited to, caprylic/capric triglyceride.

The disclosed formulations may also comprise other skin soothing agents, such as antioxidants, to reduce skin inflammation and irritation, and bio-mimetic ceramide complex that mimics the skin's natural lipid profile.

In certain embodiments of the presently disclosed formulations, ingredients therein include amino acid mixtures having one or more amino acids. In specific aspects of these embodiments, the amino acid mixtures have a profile of the human skin's natural moisturizing factor (NMF).

In other embodiments of the present disclosure, the skin treatment formulations include an amino acid mixture, having a profile of the human skin's natural moisturizing factor (NMF), including the following components formulated within the indicated ranges (all expressed as % w/w): Purified water (QS to 100%), disodium EDTA (0.10%), glycine (1.612%), L-citrulline (1.00%), L-alanine (0.921%), L-proline (0.148%), L-ornithine monohydrochloride (0.287%), L-arginine (0.073%), L-glutamic acid (0.243%), L-histidine (0.429%), valine (0.381%), L-lysine (0.179%), L-aspartic Acid (0.30%), leucine (0.262%), threonine (0.713%), tyrosine (0.295%), DL-phenylalanine (0.283%), taurine (0.032%), L-isoleucine (0.194%), methionine (0.072%), serine (2.32%).

In certain embodiments of the present disclosure, the formulations may include one or more solubilizing/emulsifying, skin-conditioning/treating agents and preservatives/stabilizing agents, such as butylene glycol, caprylic/capric triglyceride, phospholipids, SK-Influx V®, glycerin, lecithin, tocopheryl acetate, ubiquinone (co-enzyme Q10), hydrolyzed glycosaminoglycans, hexanoyl dipeptide-3 norleucine acetate, *salix nigra* (willow) bark extract, mandelic acid, bisabolol, ceramide NP, ceramide AP, phytosphingosine, cholesterol, ceramides EOP, glycine, citrulline, alanine, proline, ornithine HCl, arginine, glutamic acid, histidine, valine, lysine, aspartic acid, leucine, threonine, tyrosine, phenylalanine, taurine, isoleucine, methionine, serine, sodium lauroyl lactylate, hydrogenated polydecene, trideceth-6, xanthan gum, carbomer, sodium benzoate, phenoxyethanol, disodium EDTA.

In certain specific embodiments of the disclosed formulations, ingredients may include purified water, glycolic acid, urea, potassium hydroxide, squalane, cetearyl alcohol, cetearyl glucoside, polysorbate 60, stearyl alcohol, glyceryl stearate, PEG-100 stearate, sodium polyacrylate, butylene glycol, caprylic/capric triglyceride, lactic acid, sodium hyaluronate, hydrolyzed sodium hyaluronate, phospholipids, glycerin, *Camellia Sinensis* leaf extract, lecithin, tocopheryl acetate, ubiquinone, hydrolyzed glycosaminoglycans, hexanoyl dipeptide-3 norleucine acetate, *salix nigra* (willow) bark extract, *yucca glauca* root extract, mandelic acid, bisabolol, ceramide NP, ceramide AP, phytosphingosine, cholesterol, ceramides EOP, papain, bromelain, glycine, citrulline, alanine, proline, ornithine HCl, arginine, glutamic acid, histidine, valine, lysine, aspartic acid, leucine, threonine, tyrosine, phenylalanine, taurine, isoleucine, methionine, serine, sodium lauroyl lactylate, dimethicone, hydrogenated polydecene, trideceth-6, xanthan gum, carbomer, sodium benzoate, phenoxyethanol, disodium EDTA.

In other embodiments of the present disclosure, the formulations may include spray-on products having, for example, at least 10% AHA and 10% urea or urea derivative. The formulations may include one or more humectants, one or more emollients, one or more ceramides or skin lipid supplements, one or more antioxidants, one or more peptides having exfoliation properties, one or more amino acid components of the skin's natural moisturizing factor, and/or one or more proteolytic enzymes.

In certain specific embodiments of the disclosed spray-on formulations, ingredients may include purified water, glycolic acid, urea, potassium hydroxide, dimethicone, polysorbate 20, squalane, butylene glycol, glycerin, sodium PCA, methyl gluceth-20, PEG-7 glyceryl cocoate, dicaprylyl carbonate, lactic acid, sodium hyaluronate, hydrolyzed sodium hyaluronate, hyaluramina, phospholipids, *Camellia sinensis* leaf extract, lecithin, ubiquinone, hexanoyl dipeptide-3 norleucine acetate, *salix alba* (willow) bark extract, *yucca glauca* root extract, mandelic acid, bisabolol, ceramide NP, ceramide AP, ceramide EOP, phytosphingosine, cholesterol, papain, bromelain, glycine, citrulline, alanine, proline, ornithine HCl, arginine, glutamic acid, histidine, valine, lysine, aspartic acid, leucine, threonine, tyrosine, phenylalanine, taurine, isoleucine, methionine, serine, sucrose, panthenol, ethylhexylglycerin, sodium lauroyl lactylate, xanthan gum, carbomer, sodium benzoate, phenoxyethanol, disodium EDTA.

In other specific embodiments of the present disclosure, spray-on formulations include the following components formulated within the indicated ranges (all expressed as % w/w): Purified water (43.217%), glycolic acid (15.00%), urea (15.00%), potassium hydroxide (10.75%), squalane (1.50%), DM Fluid A6CS® (2.50%), Cetiol HE® (1.00%), Cetiol CC® (1.00%), Protasorb L-20 (2.00%), Co-Enzyme Q10 (0.02%), butylene glycol (1.50%), glycerin USP (1.50%), sodium PCA (1.50%), lactic acid (0.10%), hydrolyzed sodium hyaluronate (0.01%), hyaluramina (0.01%), mandelic acid (0.001%), green tea extract (0.10%), Active Concepts Unloaded Liposome (0.10%), P3 Peptide® (0.01%), Active Concepts Willow Bark Extract (0.01%), SK-Influx V® (0.10%), bisabolol (0.01%), Active Concepts *Yucca* Extract PF (0.10%), Natural Moisturizing Factor (0.01%), sodium hyaluronate 1% sol. (0.50%), Euxyl PE9010 (0.80%), papain (0.001%), bromelain 150 cosmetic (0.001%), sucrose (0.50%), DL panthenol (0.10%), Glucam E-20 ® (1.00%), disodium EDTA (0.05%).

The present disclosure contemplates skincare formulations having pH in the range of 2.0 to 9.0. More specifically, certain embodiments of the disclosed formulations have pH in the range of 3.5 to 7.0. A pH adjuster or buffer, such as potassium hydroxide, is provided in aspects of the present disclosure for maintaining the pH in the range of 2.0 to 9.0 and, more specifically, in the range of 3.5 to 7.0. In this, the present disclosure contemplates various suitable pH adjusters/buffering agents that are known in the art including, but not limited to, potassium hydroxide, sodium hydroxide, ammonia, among others.

In particular embodiments, formulations of the present disclosure comprise 10 to 40% glycolic acid. In various aspects of these embodiments, formulations of the present disclosure comprise 10 to 40% urea or urea derivatives. Such formulations can be, for example, those used in consumer products.

In representative embodiments, formulations of the present disclosure comprise glycolic acid, urea, potassium hydroxide, proteolytic enzymes, an amino acid profile found in healthy human skin, dimethicone, many chain lengths of fractionated and long-chain sodium hyaluronate, *Camellia sinensis* (Green Tea) polyphenols, and ceramides.

Inventors believe, without wishing to be held to that belief, that the acid component of the disclosed formulations, particularly the formulated, therapeutic levels of glycolic acid interact synergistically with the formulated urea, to exfoliate and treat dry skin.

In one embodiment of the present disclosure, the skin treatment formulations include the following ingredients: AHA, BHA, dicarboxylic acid, urea, potassium hydroxide, sodium hyaluronate, capric triglyceride, cetearyl glucoside, cetearyl alcohol, vitamin E acetate, glyceryl stearate, stearyl alcohol, stearate, emulsifying wax, phenoxyethanol, xanthan gum, squalane, dimethicone.

In other embodiments of the present disclosure, the skin treatment formulations include the following components formulated within the indicated ranges (all expressed as % w/w): AHA 20%, urea 20%. In yet other embodiments of the present disclosure, the skin treatment formulations include the following components formulated within the indicated ranges (all expressed as % w/w): AHA 30%, urea 30%. In yet further embodiments of the present disclosure, the skin treatment formulations include the following components formulated within the indicated ranges (all expressed as % w/w): AHA 20%, urea 15%. In still further embodiments of the present disclosure, the skin treatment formulations include the following components formulated within the indicated ranges (all expressed as % w/w): AHA 30%, urea 15%.

In other embodiments of the present disclosure, the skin treatment formulations include the following components formulated within the indicated ranges (all expressed as % w/w): AHA (10%-40%), urea (10%-40%), potassium hydroxide (5%-30%), hydrolyzed sodium hyaluronate (0.1%-5%), caprylic/capric triglyceride (0.1%-15%), cetearyl glucoside (0.1%-5%), cetearyl alcohol (0.1%-5%), vitamin E acetate (0.1%-10%), glyceryl stearate (0.1%-10%), stearyl alcohol (0.1%-10%), PEG-100 stearate (0.1%-5%), emulsifying wax (0.2%-15%), phenoxyethanol (0.02%-2%), xanthan gum (0.02%-2%), squalane (0.01%-10%), dimethicone (0.01%-10%).

In certain embodiments of the present disclosure, the formulations include the following ingredients formulated within the indicated ranges (all expressed as % w/w): glycolic acid (15%), urea (15%), potassium hydroxide (5%-15%), hydrolyzed sodium hyaluronate (0.01%-1%), caprylic/capric triglyceride (0.5%-5%), cetearyl glucoside (0.2%-2%), cetearyl alcohol (0.2%-2%), vitamin E acetate (0.5%-5%), glyceryl stearate (0.1%-4.5%), stearyl alcohol (0.2%-5%), PEG-100 stearate (0.2%-2.5%), emulsifying wax (0.5%-7.5%), phenoxyethanol (0.1%-1%), xanthan gum (0.05%-0.5%), squalane (0.5%-5%), dimethicone (0.05%-5%).

Topical application of the disclosed formulations may include application to specific body areas, such as, without limitation, feet, elbows, knees, that are susceptible to dermatological conditions of the type requiring the therapeutic treatments disclosed herein. Such treatments may be applied, for example, 1-3 times per day, for example, after showering, among others. The present disclosure contemplates that the disclosed treatments would reduce the dermatological conditions of the affected areas, followed by regular topical applications, as desirable or necessary, to maintain the improved condition of the body areas under treatment. In certain embodiments, the actual dosage of the formulations of the present disclosure to be topically applied to the skin will depend on, inter alia, the condition to be treated, the particular regimen to be followed, and the persona preferences of the user.

Topical application of the disclosed formulations may include various methods and means of application. In this, the present disclosure contemplates gels, wipes, foams, pump sprays, aerosols, towelettes, individually packaged pledgettes, unit dose sponge applicators, liquid applied with swabs or cotton balls, impregnated gauze or other substrates, coated silicone sheets or other sheet goods, coated bandages or externally fixed devices, on or with a sock or glove (for example, for treatment of feet and hands), either impregnated into the sock or glove, or with either moistened with the presently disclosed composition or with the sock or glove applied over the treated area, among other delivery systems that are known in the art.

In certain embodiments, the dosage of the formulations of the present disclosure to be applied to the skin is within the range of from 0.01 g to 5 g, from 0.02 g to 4 g, from 0.05 g to 3 g, from 0.1 g to 2 g, from 0.2 g to 1 g. In one aspect of these embodiments, the dosage of the formulations of the present disclosure to be applied to the skin can be 0.4 g. The actual dosage applied will depend on, inter alia, the condition to be treated, the particular regimen to be followed, and the personal preferences of the user. For example, different dosages may be used for spot treatment, multi-spot treatment, full or partial face treatment, treatment of parts of the body, such as neck, hands, among others.

Formulations of the present disclosure may be prepared under ambient conditions. In certain embodiments, formulations of the present disclosure are prepared under an inert atmosphere. In particular aspect of this embodiment, the inert atmosphere is an inert gas, such as but not limited to, nitrogen, argon, or combinations thereof. In certain embodiments formulations of the present disclosure are prepared under a dry inert atmosphere, which may comprise, consist essentially of, or consist of one or more dry inert gases, including but not limited to dry nitrogen, dry argon, or a combination thereof.

Example 1

The following study was carried out by an independent clinical research organization (CRO) with 10 human subjects.

Subjects applied aliquots of a presently-disclosed topical formulation, having glycolic acid 15% and urea 15% cream, twice daily to extremely dry, cracked heels. After ten days of treatment, clinical photographs were taken and subject assessments were performed.

The data obtained and the clinical photographs demonstrated surprising results in terms of the amount of dry and dead skin that was removed in an unexpectedly short time, the rapid and unexpected appearance of renewal and hydration of the skin, and the absence of irritation at such levels of an AHA/glycolic acid and urea.

In self-assessments, the subjects indicated that their treatments were excellent, with 100% of the study participants stating that the product was effective and improved their dry heel condition. 27.2% noted improvement after a single treatment and 72.7 reported improvement after just a few applications. None of the subjects felt that it took the presently-disclosed formulations a long time to perform.

The data obtained demonstrates the effectiveness of the disclosed formulations for improvement in skin properties.

Example 2

The following clinical study was carried out by a dermatologist with 7 human subjects.

Subjects applied aliquots of a presently-disclosed topical formulation, having glycolic acid 15% and urea 15% cream, twice daily for six weeks. After treatment, 85.7% of the subjects noticed improvement in skin texture, such as, bumps and dry, flaky skin, during that time.

The data obtained demonstrates the effectiveness of the disclosed formulations for improvement in skin properties. In particular, the clinical study yielded results which clearly indicate that the presently-disclosed formulations are effective in decreasing the intensity of appearance of keratosis pilaris (KP) after 4 to 6 weeks of use.

Exemplary Composition Ranges

Cream Emulsion:

| Ingredient | Example 1-% w/w | Example 2-% w/w |
| --- | --- | --- |
| Purified Water | QS to 100% | QS to 100% |
| Disodium EDTA | 0.01-0.2 | 0-0.3 |
| Sodium Benzoate | 0.01-0.5 | 0.01-1.0 |
| Hydrolyzed Sodium Hyaluronate | 0.01-1.0 | 0.1-5.0 |
| Butylene Glycol | 0.1-5.0 | 0-15.0 |
| Keltrol T ® | 0.05-0.5 | 0.02-2.0 |
| Potassium Hydroxide | 5.0-15.0 | 5.0-30.0 |
| Urea | 10.0-20.0 | 10.0-40.0 |
| Glycolic Acid | 10.0-20.0 | 10.0-40.0 |
| Caprylic/Capric Triglyceride | 0.5-5.0 | 0.1-15.0 |
| Squalane | 0.50-5.0 | 0.01-10.0 |
| Cetearyl Glucoside | 0.2-2.0 | 0.1-5.0 |
| Cetearyl Alcohol | 0.20-2.0 | 0.1-5.0 |
| Vitamin E Acetate | 0.05-5.0 | 0.1-10.0 |
| Dimethicone/100 cst | 0.05-5.0 | 0.01-10.0 |
| Glyceryl Stearate | 0.1-4.5 | 0.1-1.0 |
| Stearyl Alcohol | 0.2-5.0 | 0.1-10 |
| PEG-100 Stearate | 0.2-2.5 | 0.1-5.0 |
| Emulsifying Wax | 0.5-7.5 | 0.2-15.0 |
| Co-Enzyme Q10 | 0.01-0.5 | 0-1.0 |
| Phenoxyethanol | 0.1-1.0 | 0.02-2.0 |
| Hydrolyzed Glycosaminoglycans | 0.01-1.0 | 0-5.0 |
| Papain | 0.001-0.2 | 0.001-1.0 |
| Bromelain | 0.001-0.2 | 0.001-1.0 |
| Mandelic Acid | 0.01-5.0 | 0-10.0 |
| Lactic Acid | 0.10-2.0 | 0.10-5.0 |
| Green Tea Extract | 0.1-10.0 | 0-25.0 |
| Phospholipids | 0.1-1.0 | 0-10 |
| P3 Peptide ® | 0.01-2.5 | 0-5.0 |
| Willow Bark Extract | 0.01-10.0 | 0-25.0 |
| SK-Influx V ® | 0.1-2.5 | 0-10.0 |
| Sodium Hyaluronate | 0.01-0.2 | 0-3.0 |

-continued

| Ingredient | Example 1-% w/w | Example 2-% w/w |
| --- | --- | --- |
| Bisabolol | 0.01-0.50 | 0-5.0 |
| Yucca Extract | 0.1-10.0 | 0-30.0 |
| Natural Moisturizing Factor | 0.01-1.0 | 0.01-15.0 |
| Rapithix A-60 ® | 0.2-2.0 | 0.1-5.0 |

Spray-on:

| Ingredient | Example 1-% w/w | Example 2-% w/w |
| --- | --- | --- |
| Purified Water | QS to 100% | QS to 100% |
| Disodium EDTA | 0.02-0.05 | 0.01-0.1 |
| DL Panthenol | 0.1-2.5 | 0.1-5.0 |
| Sucrose | 0.5-2.0 | 0.5-5.0 |
| Glucam E-20 ® | 1.0-5.0 | 0.1-15 |
| Glycerin USP | 1.5-5.0 | 0.1-15 |
| Butylene Glycol | 1.5-5.0 | 0.25-15 |
| Sodium PCA | 1.5-5.0 | 0.1-20 |
| Papain | 0.001-0.2 | 0.001-1.0 |
| Bromelain | 0.001-0.2 | 0.001-1.0 |
| Hydrolyzed Sodium Hyaluronate | 0.01-1.0 | 0.01-2.0 |
| DM Fluid A6CS ® | 2.5-5.0 | 1.5-8.0 |
| Squalane | 1.5-5.0 | 1.0-7.0 |
| Cetiol HE ® | 1.0-5.0 | 1.0-7.0 |
| Polysorbate 20 | 2.0-10.0 | 1.0-15.0 |
| Cetiol CC ® | 1.0-5.0 | 0.1-15 |
| Co-Enzyme Q10 | 0.01-0.28 | 0.01-2.0 |
| Urea | 10.0-20.0 | 5.0-25.0 |
| Glycolic Acid | 10.0-20.0 | 5.0-25.0 |
| Lactic Acid | 0.10-2.75 | 0.1-5.0 |
| Potassium Hydroxide | 8.0-15.0 | 5.0-20.0 |
| Hyaluramina | 0.01-0.75 | 0.01-3.0 |
| Mandelic Acid | 0.001-2.5 | 0.001-5.0 |
| Green Tea Extract | 0.1-1.0 | 0.1-5.0 |
| Unloaded Liposome | 0.1-5.0 | 0.01-7.5 |
| P3 Peptide ® | 0.01-1.0 | 0.01-2.0 |
| Willow Bark Extract | 0.01-1.0 | 0.01-2.0 |
| SK-Influx V ® | 0.10-2.5 | 0.1-5.0 |
| Bisabolol | 0.01-1.0 | 0.01-5.0 |
| Yucca Extract | 0.10-1.0 | 0.1-10.0 |
| Natural Moisturizing Factor | 0.01-2.75 | 0.01-15.0 |
| Sodium Hyaluronate | 0.50-1.0 | 0.1-5.0 |
| Euxyl PE9010 | 0.20-0.80 | 0.00-4.0 |

What is claimed is:

1. A topical formulation comprising (% w/w):
   at least 15% alpha hydroxy acid (AHA), wherein the AHA comprises glycolic acid at least 10% urea or a urea derivative,
   10.75%-30% potassium hydroxide, and
   0.01%-5% hydrolyzed sodium hyaluronate, and
   one or more of an exfoliating peptide, or a proteolytic enzyme,
   an amino acid mixture, wherein the amino acid mixture consists of water, disodium EDTA, glycine, L-citrulline, L-alanine, L-proline, L-ornithine monohydrochloride, L-arginine, L-glutamic acid, L-histidine, valine, L-lysine, L-aspartic acid, leucine, threonine, tyrosine, DL-phenylalanine, taurine, L-isoleucine, methionine, and serine and wherein the amino acid mixture has a profile of the skin's natural moisturizing factor, and
   one or more exfoliating agents comprising mandelic acid.

2. The formulation of claim 1, wherein the glycolic acid is 15% w/w and the urea is 15% w/w.

3. The formulation of claim 1, comprising 10% to 30% urea or a urea derivative.

4. The formulation of claim 1, wherein the formulation has pH in the range of 3.5 to 7.0.

5. The formulation of claim 1, further comprising one or more of an antioxidant, an emulsifier, a moisturizer, and an emollient.

6. The formulation of claim 1, comprising (% w/w):
15%-40% AHA;
10%-40% urea or urea derivative;
10.75%-15% potassium hydroxide;
0.1%-5% hydrolyzed sodium hyaluronate;
0.1%-15% capric triglyceride;
0.1%-5% cetearyl glucoside;
0.1%-5% cetearyl alcohol;
0.1%-10% vitamin E acetate;
0.1%-10% glyceryl stearate;
0.1%-10% stearyl alcohol;
0.1%-5% PEG-100 stearate;
0.2%-15% emulsifying wax;
0.2%-2% phenoxyethanol;
0.2%-2% xanthan gum;
0.1%-10% squalane;
0.1%-10% dimethicone.

7. The formulation of claim 1, comprising (% w/w):
15% glycolic acid;
15% urea;
10.75%-15% potassium hydroxide;
0.01%-1% hydrolyzed sodium hyaluronate;
0.5%-5% capric triglyceride;
0.2%-2% cetearyl glucoside;
0.2%-2% cetearyl alcohol;
0.5%-5% vitamin E acetate;
0.1%-4.5% glyceryl stearate;
0.2%-5% stearyl alcohol;
0.2%-2.5% PEG-100 stearate;
0.5%-7.5% emulsifying wax;
0.1%-1% phenoxyethanol;
0.05%-0.5% xanthan gum;
0.05%-5% squalane;
0.5%-5% dimethicone.

8. The formulation of claim 1, further comprising a beta hydroxy acid (BHA), or ceramides.

9. A spray-on formulation comprising (% w/w):
at least 15% alpha hydroxy acid (AHA), wherein the AHA comprises glycolic acid, at least 10% urea or a urea derivative,
10.75%-30% potassium hydroxide, and
0.01%-5% hydrolyzed sodium hyaluronate, and
one or more of an exfoliating peptide, or a proteolytic enzyme,
an amino acid mixture, wherein the amino acid mixture consists of water, disodium EDTA, glycine, L-citrulline, L-alanine, L-proline, L-ornithine monohydrochloride, L-arginine, L-glutamic acid, L-histidine, valine, L-lysine, L-aspartic acid, leucine, threonine, tyrosine, DL-phenylalanine, taurine, L-isoleucine, methionine, and serine and wherein the amino acid mixture has a profile of the skin's natural moisturizing factor; and
one or more exfoliating agents comprising mandelic acid.

10. The spray-on formulation of claim 9, further comprising one or more humectants.

11. The spray-on formulation of claim 9, further comprising one or more emollients.

12. The spray-on formulation of claim 9, further comprising skin lipid supplements.

13. The spray-on formulation of claim 9, further comprising one or more antioxidants, wherein the one or more antioxidants comprises *Camellia sinensis* (Green Tea) polyphenols.

14. The formulation of claim 9, further comprising a beta hydroxy acid (BHA), or ceramides.

15. A method for therapeutic treatment of a dermatological condition, comprising topically applying to an affected area a therapeutically effective amount of a formulation of claim 1, thereby treating the dermatological condition.

16. The method of claim 15, wherein the treating includes exfoliating affected skin.

17. The method of claim 15, wherein the affected area is one or more of human skin, scalp, hair, nails.

18. The method of claim 15, wherein the AHA is glycolic acid.

19. The method of claim 15, wherein the formulation comprises 15% glycolic acid and 15% urea or a urea derivative.

20. The method of claim 15, wherein the formulation comprises 10% to 30% urea or a urea derivative.

21. The method of claim 15, wherein the formulation has pH in the range of 3.5 to 7.0.

22. The method of claim 15, wherein the dermatological condition is keratosis pilaris.

23. The method of claim 15, wherein the dermatological condition is very dry skin.

24. The method of claim 15, wherein the formulation further comprises one or more of an exfoliating peptide, an amino acid having a natural moisturizing factor profile, a proteolytic enzyme, a keratolytic agent, a beta hydroxy acid (BHA), ceramides, sodium hyaluronate.

25. The method of claim 15, wherein topically applying the formulation is pre-treatment for application of a topical agent for treatment of the dermatological condition.

* * * * *